United States Patent [19]
Anderson et al.

[11] Patent Number: 6,155,688
[45] Date of Patent: Dec. 5, 2000

[54] DARK FIELD PROJECTION DISPLAY

[75] Inventors: Duncan James Anderson, Abingdon; Robert George Watling Brown, Thame; Nicholas Mayhew, Oxford, all of United Kingdom; Michael Geraint Robinson, Boulder, Colo.; Jason Slack, Cowley, United Kingdom; Haruhisa Takiguchi, Kashiwa, Japan

[73] Assignee: Sharp Kabushiki Kaisha, Osaka, Japan

[21] Appl. No.: 09/145,893

[22] Filed: Sep. 2, 1998

[30] Foreign Application Priority Data

Sep. 5, 1997 [GB] United Kingdom .................... 9718741
Jan. 3, 1998 [GB] United Kingdom .................... 9800018

[51] Int. Cl.$^7$ ................................................. G03B 21/28
[52] U.S. Cl. ............................................. 353/99; 353/38
[58] Field of Search .................................. 353/38, 98, 99, 353/69, 70; 349/5, 7, 8, 67, 61; 362/309, 308, 328, 346

[56] References Cited

U.S. PATENT DOCUMENTS

| | | | |
|---|---|---|---|
| 3,296,923 | 1/1967 | Miles | 88/24 |
| 4,497,015 | 1/1985 | Konno et al. | 362/268 |
| 5,005,969 | 4/1991 | Kataoka | 353/122 |
| 5,085,506 | 2/1992 | Kahn et al. | 353/38 |
| 5,379,083 | 1/1995 | Onozuka | 353/99 |
| 5,418,593 | 5/1995 | Fyson | 354/330 |
| 5,463,497 | 10/1995 | Muraki et al. | 359/618 |
| 5,473,393 | 12/1995 | Manabe | 353/38 |
| 5,555,041 | 9/1996 | Manabe . | |
| 5,594,526 | 1/1997 | Mori et al. | 355/67 |
| 5,613,768 | 3/1997 | Kim | 362/298 |
| 5,662,401 | 9/1997 | Shimizu et al. | 353/38 |
| 5,755,503 | 5/1998 | Chen et al. | 353/99 |
| 5,971,568 | 10/1999 | Kabuki | 362/297 |

FOREIGN PATENT DOCUMENTS

| | | |
|---|---|---|
| 0201306 | 12/1986 | European Pat. Off. . |
| 0343729 | 11/1989 | European Pat. Off. . |
| 0395156 | 10/1990 | European Pat. Off. . |
| 0493365 | 7/1992 | European Pat. Off. . |
| 0527084 | 2/1993 | European Pat. Off. . |
| 0660158 | 6/1995 | European Pat. Off. . |
| 0740169 | 10/1996 | European Pat. Off. . |
| 0811872 | 12/1997 | European Pat. Off. . |
| 1353739 | 5/1974 | United Kingdom . |
| 1391677 | 4/1975 | United Kingdom . |
| 2125983 | 3/1984 | United Kingdom . |
| 9500865 | 1/1995 | WIPO . |
| 9518984 | 7/1995 | WIPO . |
| 9641224 | 12/1996 | WIPO . |

OTHER PUBLICATIONS

H. Roder et al.; JN. Display, vol. 16, No. 1, pp. 27–33, 1995, "Full–Colour Diffraction–Based Optical System For Light–Valve Projection Displays".

D. Armitage, SPIE, vol. 2650, pp. 41–51, "Design Issues in Liquid–Crystal Projection Displays".

D.M. Bloom, Photonics West/Electronic Imaging '97 Spie, Feb., 1997, "The Grating Light Valve: Revolutionizing Display Technology".

(List continued on next page.)

*Primary Examiner*—William Dowling
*Attorney, Agent, or Firm*—Renner, Otto, Boisselle & Sklar

[57] ABSTRACT

A dark field projection display includes a light source, a spatial light modulator, and an optical system for directing light from the light source onto the spatial light modulator. The optical system includes a plurality of optical subsystems and a plurality of reflectors. Each of the optical subsystems has an input aperture and is arranged to image light from the light source, the subsystems forming a spatial distribution of source images whose relative positions are different from the relative positions of the input apertures. Each of the optical subsystems further includes a plurality of reflectors disposed at the relative positions of the source images. Each of the reflectors is arranged to reflect light from a respective one of the subsystems onto the spatial light modulator.

17 Claims, 11 Drawing Sheets

OTHER PUBLICATIONS

L.J. Hornbeck, Euro Display, pp. 67–71, 1996, "Digital Light Processing For Projection Displays: A Progress Report".

H. Hamada et al.; IDRC '94 Proceedings, pp. 422–423, 1994, "A New Bright Single Panel LC–Projection System Without A Mosaic Color Filter".

C. Joubert et al.; Spie Proceedings, vol. 2650, 1996, "Dispersive Holographic Microlens Matrix For Single LCD Projection".

L.J. Hornbeck; Digital Light Processing and Mems, pp. 3–21, 1995, "Digital Light Processing and Mems: Timely Convergence For a Bright Future".

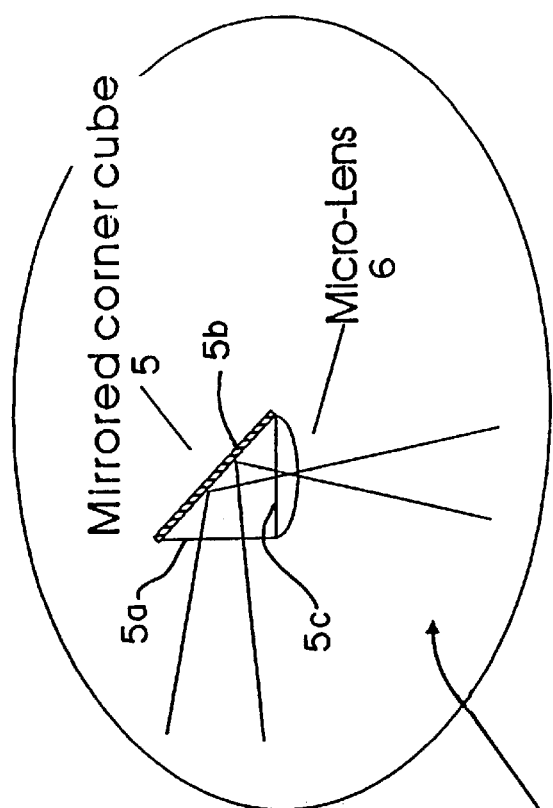
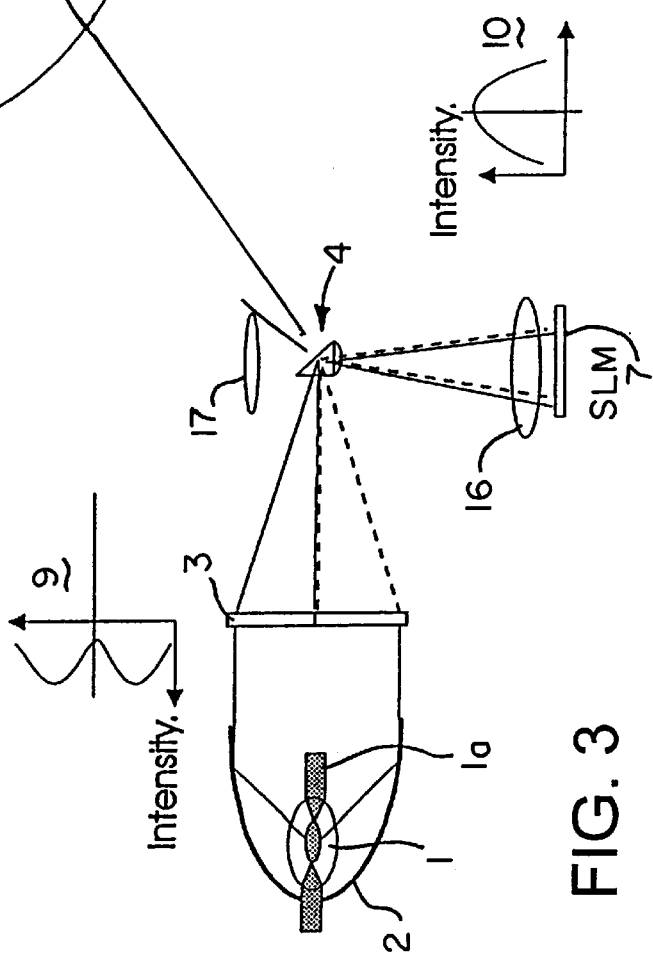
FIG. 2
FIG. 3

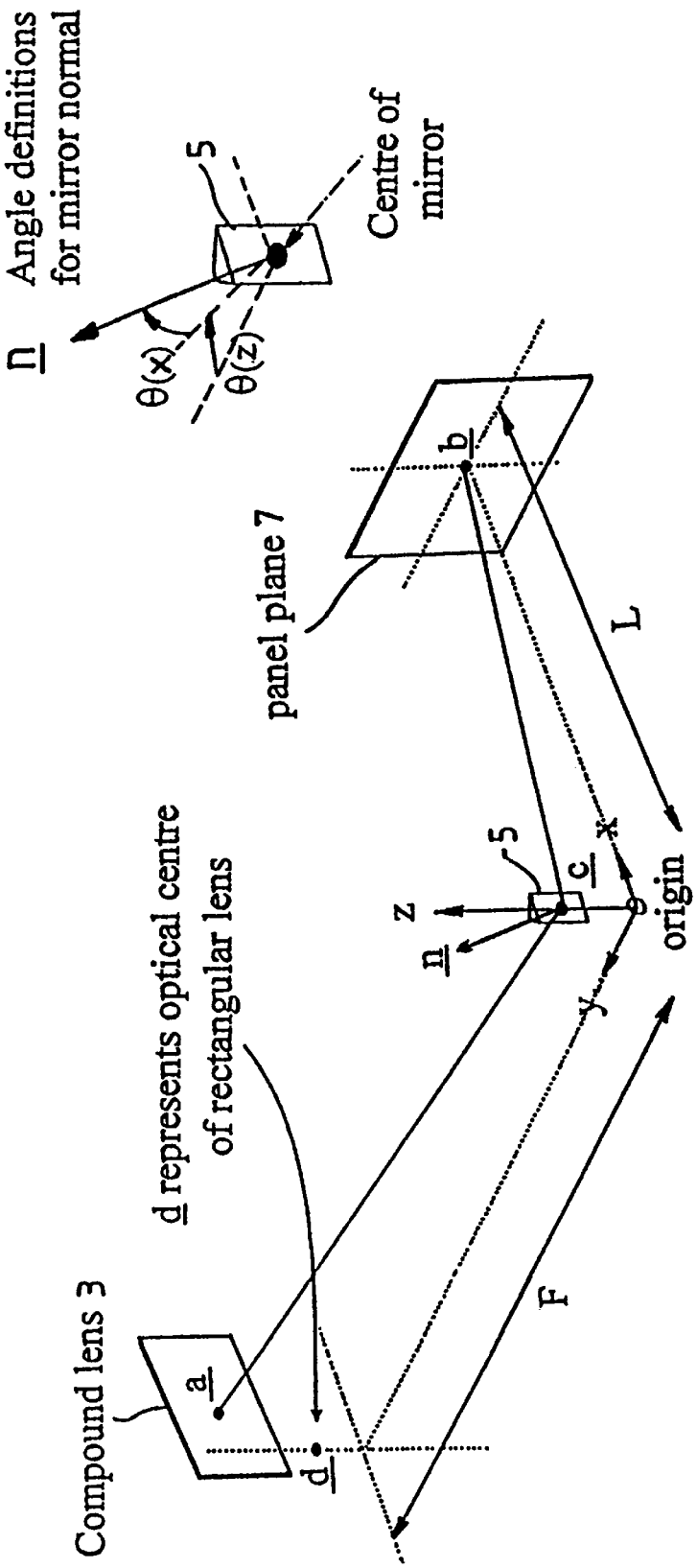

FIG. 10

$\underline{a} = (a1, a2, a3)$ represents the vector at the centre of the lens rectangular section
$\underline{b} = (b1, 0, 0)$ represents the vector at the centre of the device
$\underline{c} = (d1, d2-F, d3)$ represents the vector at the centre of the mirror
$\underline{d} = (d1, d2, d3)$ represents the vector at the optical centre of the lens section
$\underline{n} = (xn, yn, 3n)$ represents the normal vector of the mirror

DARK FIELD PROJECTION DISPLAY

The present invention relates to a dark field projection display.

The term "optical extent" as used herein is defined to mean the product of the size and optical divergence of a beam of light.

Certain optical systems are inherently one dimensional in that they effectively integrate the optical intensity in one dimension and are therefore tolerant to optical extent in the orthogonal dimension. Examples of such systems include projection systems, for instance projection television systems, which modulate light by deflecting it in one dimension and which require light sources which are physically small in that dimension. Known systems of this type use small light sources which have lifetime restriction making them unsuitable or undesirable for commercial products. Metal halide lamps with relatively large electrode gaps are efficient in terms of conversion of electricity into light output and have relatively long lifetimes. Such lamps are therefore suitable for use in home consumer projection systems. However, it is desirable to provide smaller light sources with longer lifetimes so as to improve the performance of projection displays.

H. Roder, H. J. Ehrke, R. Gerhard-Multhaupt, E. Ipp and Imenzel, "Full Color Diffraction-based Optical System for Light Valve Projection Displays" Jn. Display vol. 16 No.1 1995 pp 27–33 and David Armitage "Design Issues in Liquid Crystal Projection Displays", pp.41–51 SPIE Proceedings Vol. 2650 Projection Displays II Editor(s): Ming H. Wu, Hamamatsu Corp., Bridgewater, N.J., USA. ISBN: 0-8194-2024-7, 308 pages, published 1996 disclose a known type of system generally referred to as a Schlieren or dark field optical system. Such a system is suitable for use with projection displays, for instance as disclosed in "The Grating Light Valve: revolutionising Display Technology" D. M. Bloom, Photonics West/Electronic Imaging '97 SPIE and in EP 0 811 872. However, such systems suffer from the disadvantages described hereinbefore of requiring a small light source of high efficiency.

Examples of other devices which require illumination sources which are small in one dimension are disclosed in "Digital Light Processing for Projection Displays: A Progress Report" Larry J. Hornbeck, Proceedings Society of Information Display 16 th International Display Research Conference 1009 pp 67–71 and H. Hamada et al "A New Bright Single Panel LC-Projector System without a Mosaic Color Filter" IDRC '94 Proceedings, 422 (1994) and C. Joubert, B. Loiseaux, A. Delboulbe and Huignard J–P "Dispersive Holographic Microlens Matrix for LCD Projection" SPIE Proceedings Vol. 2650 Projection Displays II Editor (s): Ming H. Wu, Hamamatsu Corp., Bridgewater, N.J., USA. ISBN: 0-8194-2024-7, 308 pages (published 1996).

U.S. Pat. No. 3,296,923, U.S. Pat. No. 4,497,015 and U.S. Pat. No. 5,594,526 disclose arrangements for improving the uniformity of illumination provided by a light source in the form of a light emitter and a light gathering reflector such as an elliptical mirror. In such light sources, the light emitter itself partially obscures light directed into the output beam so that the output beam has an annular intensity distribution. The above-mentioned patents attempt to make the distribution more uniform by sampling the light beam from the light source in a plurality of optical systems to produce images with the same relative positions as the input apertures of the optical systems. The outputs of the optical systems are then recombined so as to overlap each other by a further optical device which is generally a lens.

Although systems of this type are capable of producing an output light beam with a substantially flat intensity distribution at an image plane of the illumination source, they are not capable of altering the optical extent, ie: the product of the area of the light source and the radiating solid angle.

Systems which are capable of altering or redistributing optical extent are disclosed in GB 2 125 983, GB 1 391 677, GB 1 353 739, EP 0 660 158, EP 0 527 084, EP 0 493 365, EP 0 395 156, EP 0 343 729, EP 0 201 306, WO 96/41224, WO 95/18984, WO 95/00865, U.S. Pat. No. 5,463,497 and U.S. Pat. No. 5,005,969.

U.S. Pat. No. 5,662,401 and U.S. Pat. No. 5,418,593 each discloses an optical system for illuminating a spatial light modulator. The optical system re-distributes the extent of the light source, so as to improve the uniformity of illumination of the spatial light modulator. The optical systems disclosed in these documents consist of two arrays of refracting lenses.

According to the invention, there is provided a dark field projection display comprising a light source, a spatial light modulator, and an optical system for directing light from the light source onto the spatial light modulator, characterised in that the optical system comprises; a plurality of optical subsystems, each of which has an input aperture and is arranged to image light from the light source, the subsystems forming a spatial distribution of source images whose relative positions are different from the relative positions of the input aperture; and a plurality of reflectors disposed at the relative positions of the source images, each of the reflectors being arranged to reflect light from a respective one of the sub-systems on to the spatial light modulator.

A "dark field" optical system is an optical system that normally appears dark. Only areas of the optical system that scatter or diffract light past an edge (or a "stop") appear bright. For example, when the optical system shown in FIG. 12 is in the OFF state (that is, when the LCD panel 7 is not in the diffractive state), the LCD panel will act as a mirror. Light from the lamp 1 that is incident on the LCD panel 7 will be reflected back towards the lamp 1 and not towards the projection lens 17, so that the projection lens will see a dark field. Light is directed to the projection lens 17 only when the LCD panel 7 is in the diffractive state (ie, when the optical system is in the ON state), so that light is diffracted by the LCD panel 7 past the second array of reflectors 4 to the projection lens 17.

The reflectors may be disposed between the spatial light modulator and a projection optic for receiving light deflected by the spatial light modulator.

A field lens may be disposed between the reflectors and the spatial light modulator.

Each of the reflectors may include or may be associated with imaging means for forming overlapping images of the input apertures at the spatial light modulator.

The overlapping images may be substantially superimposed on each other.

Each reflector may comprise a plane reflector and may be associated with an image forming device. Each image forming device may be a converging lens.

Each light deflecting element may comprise a concave reflector. Each reflector may comprise a mirror whose reflecting surface has the shape of part of a paraboloid.

The input apertures may be arranged as a two dimensional array and the spatial distribution of source images may comprise a one dimensional array.

Each sub-system may comprise an optical imaging element. Each of the imaging elements may comprise a converging lens. The converging lenses may comprise relatively displaced portions of a Fresnel lens. As an alternative, the converging lenses may comprise an array of microlenses. The microlenses may have rectangular apertures.

The light source may comprise a light emitter and a concave reflector and the optical imaging element may comprise relatively displaced portions of the concave reflector. The reflector may be of ellipsoidal shape.

It is thus possible to provide a dark field projection display having a compact optical system and with substantially uniform illumination intensity at the spatial light modulator. Also, compared with known projection systems, increased image brightness at a screen of the projection system can be provided by virtue of the optical extent modification.

The invention will be further described, by way of example, with reference to the accompanying drawings, in which:

FIG. 2 is a cross-sectional view to an enlarged scale of a detail of FIG. 1;

FIG. 3 is a cross-sectional view of the embodiment of FIG. 1 including graphs illustrating intensity distributions;

FIG. 10 is a diagram illustrating how the orientation of a mirror in the various embodiments may be determined;

Like reference numerals refer to like parts throughout the drawings.

Figure 1:
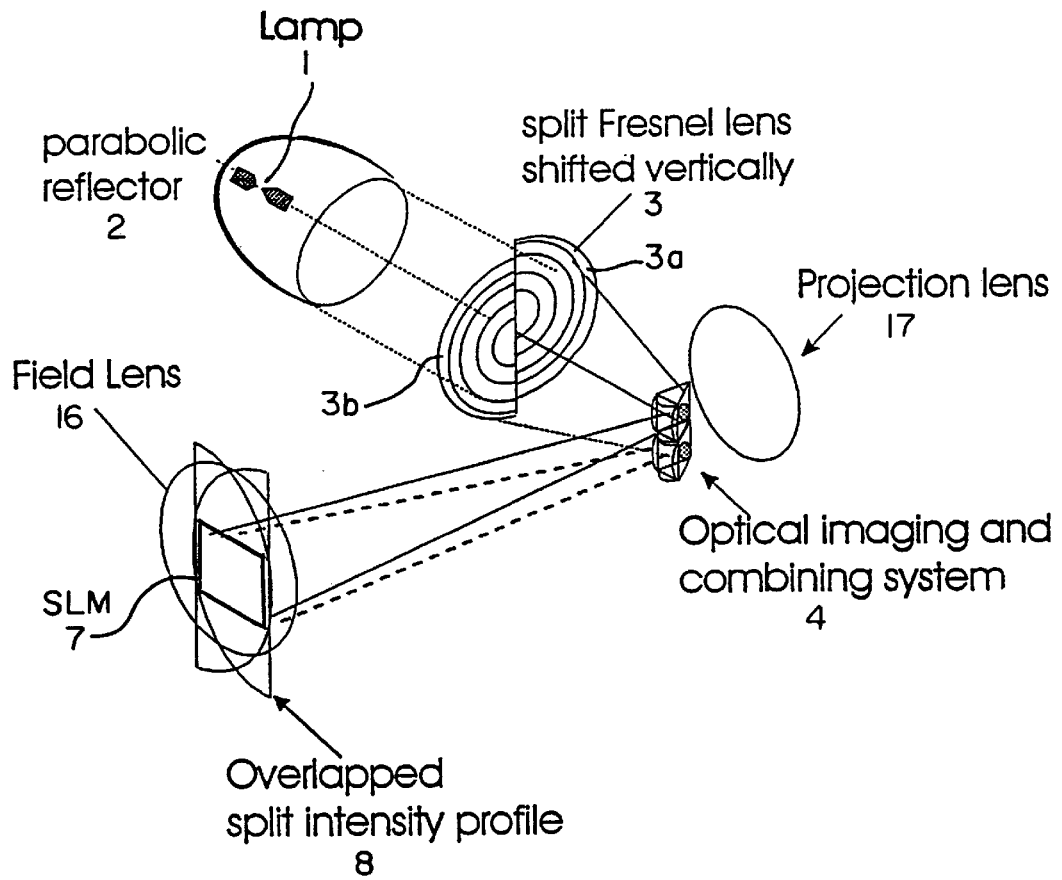
FIG. 1 is a diagram illustrating a display constituting a first embodiment of the invention.

The dark field projection display illustrated in FIGS. 1 to 3 comprises a light source in the form of a lamp 1, such as an arc lamp, and a parabolic reflector 2. The light source produces a substantially collimated beam which is incident on a split Fresnel lens 3. The lens 3 comprises two semi-circular halves 3a and 3b with the half lens 3a being displaced vertically upwardly with respect to the half lens 3b.

The half lenses 3a and 3b form images of the light source at an optical imaging and combining system 4 in the form of two mirrored corner cubes 5 and microlenses 6. As shown in FIG. 2, each mirrored corner cube 5 comprises half of a cube of transparent material, such as glass or plastics, having an inclined surface 5b which is made reflective, for instance by silvering. Light from the split lens 3 is incident on a surface 5a through which it passes and is reflected at the silvered surface 5b. The microlens 6 is formed at the output surface 5c of the mirrored corner cube 5.

The images of the light source 1, 2 formed by the half lenses 3a and 3b are disposed at the respective mirrored corner cubes 5, in particular, at the reflecting surfaces 5b. The microlenses 6 in turn form images of the apertures of the half lenses 3a and 3b on a spatial light modulator (SLM) 7 via a field lens 16. The images are overlapped as shown at 8. Light from picture elements (pixels) of the SLM are selectively deflected, for example by reflection or diffraction, is directed to a projection lens 17 which projects an image corresponding to image data supplied to the SLM 17 onto a front or back projection screen (not shown).

The split lens 3 forms a plurality of optical sub-systems, namely the half lenses 3a and 3b. Each sub-system 3a, 3b has an input aperture which, in this embodiment, comprises the shape of the half lens in the optical plane thereof, and images light from the light source to form source images at the surface 5b of the respective mirrored corner cube 5. The sub-systems (half lenses 3a, 3b) form a spatial distribution (vertically spaced) of the source images whose relative positions are different from the relative positions (horizontally spaced) of the input apertures.

The light source 1, 2 produces an intensity distribution illustrated at 9 in FIG. 3. The output beam of the light source 1, 2 is substantially collimated and comprises a cylindrical light beam of cylindrically symmetrical intensity distribution. The lamp 1 partially obscures light, for instance as a result of an electrode 1a disposed between the lamp 1 and the split lens 3. As a result, the light distribution has an annular peak and is reduced at the centre or axis of the light source and towards the edges of the output beam.

The two half lenses 3a and 3b divide the extent of the light source 1, 2 into two beams which are individually imaged at the SLM 7 by the two mirrored corner cubes 5 and microlenses 6. The resulting images overlap and, as shown in FIGS. 1 and 3, may be substantially superimposed on each other. As a result of incoherent mixing of the images formed by the microlenses 6, the illumination has a substantially more homogeneous or uniform intensity distribution as illustrated at 10 in FIG. 3. Further, the extent of the light source 1, 2 is modified to provide an extent at the SLM 7 which is reduced in one dimension and increased in the orthogonal dimension. The illumination may therefore be made more "one dimensional" and is particularly suitable for illuminating, for instance, SLMs of the type disclosed in EP 0 811 872. In particular, the display brightness and contrast ratio may be increased and the improved uniformity of intensity distribution provides a more evenly illuminated image.

Figure 4:
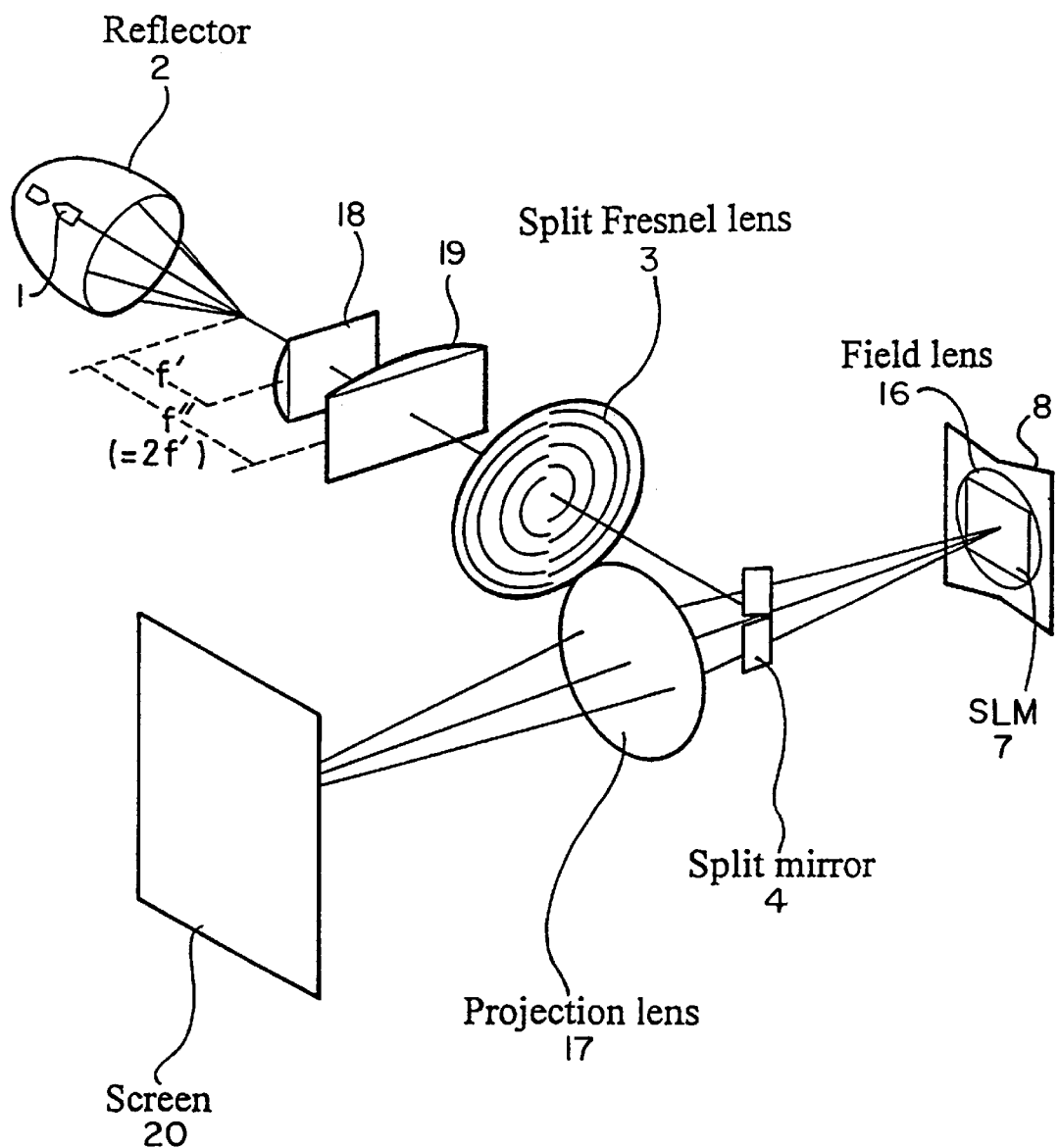
FIG. 4 is a diagram illustrating a display constituting a second embodiment of the invention.

FIG. 4 illustrates a dark field projection display which differs from that shown in FIG. 1 to 3 in that the reflector 2 is ellipsoidal, cylindrical lenses 18 and 19 are disposed between the light source 1,2 and the split lens 3, and the optical combining system 4 comprises a split plane mirror. Light from the lamp 1 and reflector 2 is collimated by the cylindrical collimating lenses 18 and 19. The focal length f" of the lens 19 is equal to twice the focal length f of the lens 18. Each of the lenses 18 and 19 alters the divergence in one dimension with a corresponding alteration in that dimension of the image size. This equalises the divergence of the light source and allows a uniform illumination cone to be produced. This has the effect of producing an oval image of the circular source when imaged by the split Fresnel lens 3. Offsetting the images produced by the lens halves results in two images having their extents reduced by approximately a half in the horizontal direction. The split mirror 4 at the image plane adjusts the direction of optical propagation from these two images and produces a near uniform illumination region via the field lens 16 at the SLM 7.

Figure 5:
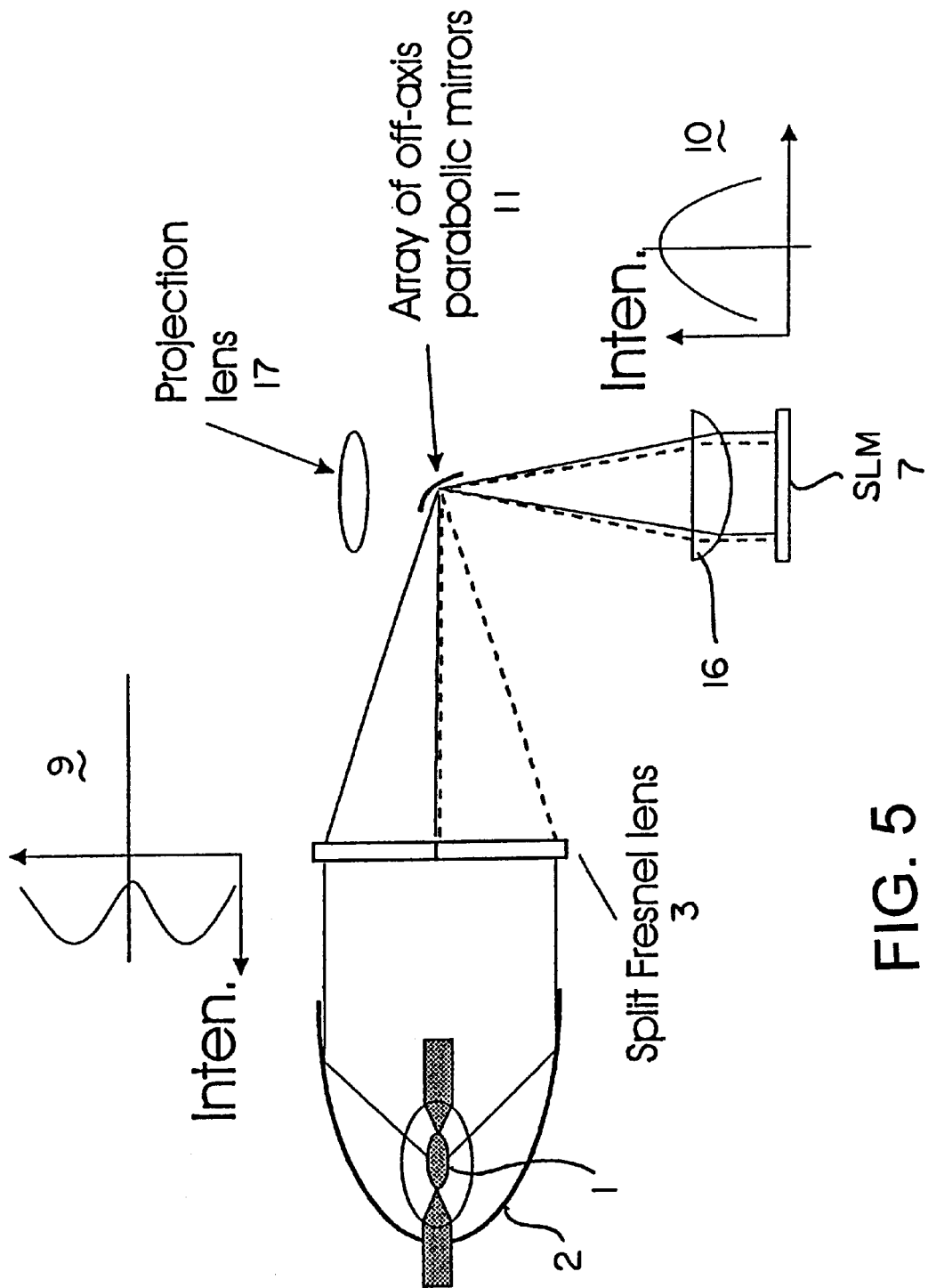
FIG. 5 is a view similar to FIG. 3 of a display constituting a third embodiment of the invention.

The display shown in FIG. 5 differs from that shown in FIGS. 1 to 3 in that the mirrored corner cubes 5 and microlenses 6 are replaced by an array of off-axis parabolic mirrors 11 which form the optical imaging and combining system. The array comprises two mirrors 11 for imaging the two half lenses 3a and 3b of the split Fresnel lens 3. Each mirror 11 performs the deflecting and imaging function of one of the mirrored corner cubes 5 and one of the microlenses 6.

Figure 6:
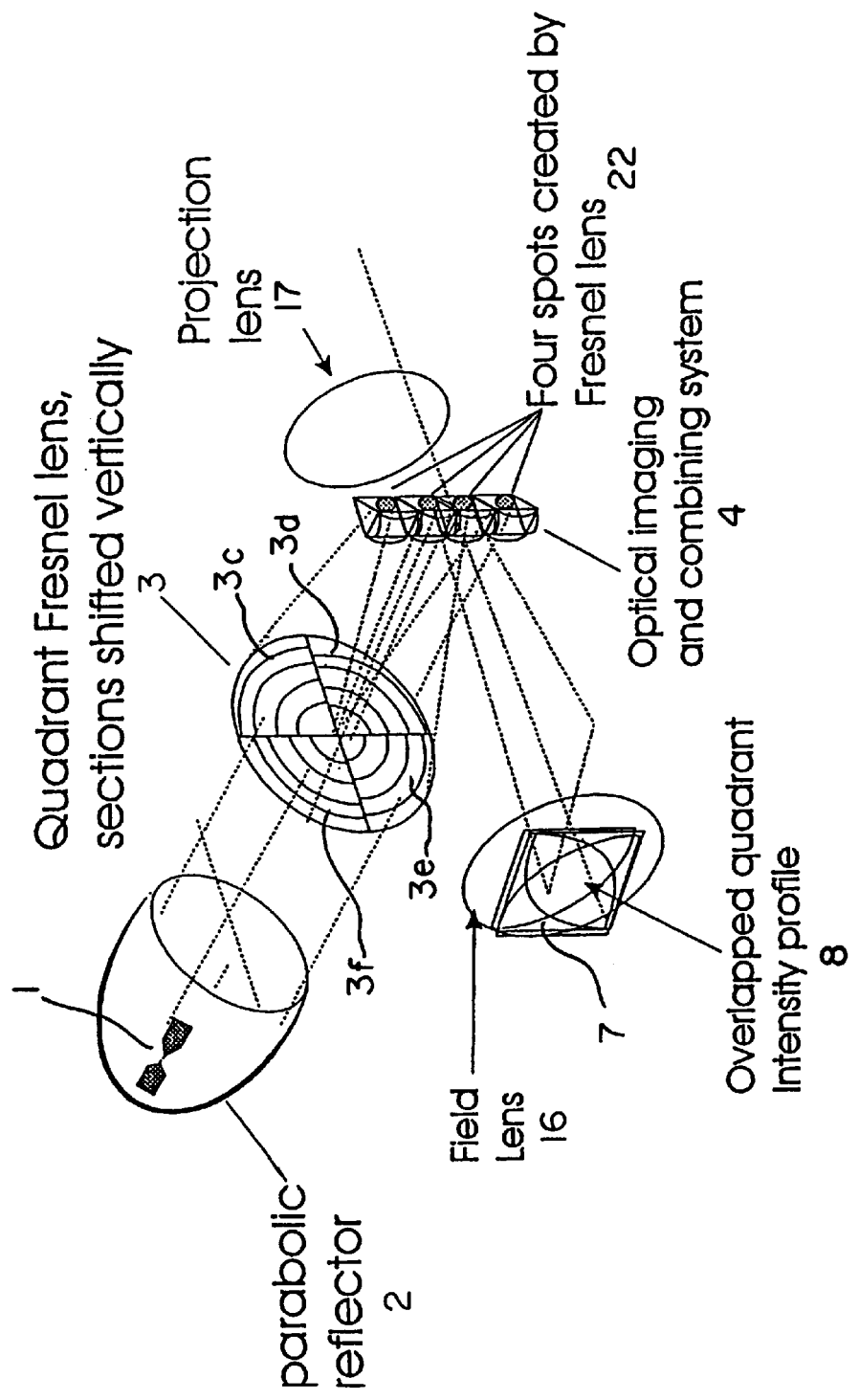
FIG. 6 is a view similar to FIG. 1 of a display constituting a fourth embodiment of the invention.

FIG. 6 illustrates a display which differs from that shown in FIG. 1 in that the Fresnel lens 3 is divided into four quadrants 3c, 3d, 3e, 3f which are vertically shifted or displaced relative to each other so as to form four spots 22, comprising respective images of the light source 1, 2, at different heights. Also, the system 4 comprises four mirrored corner cubes and microlenses such that the four spots 22 are formed at the reflecting surfaces 5b of the four mirrored corner cubes 5, respectively.

Figure 7:
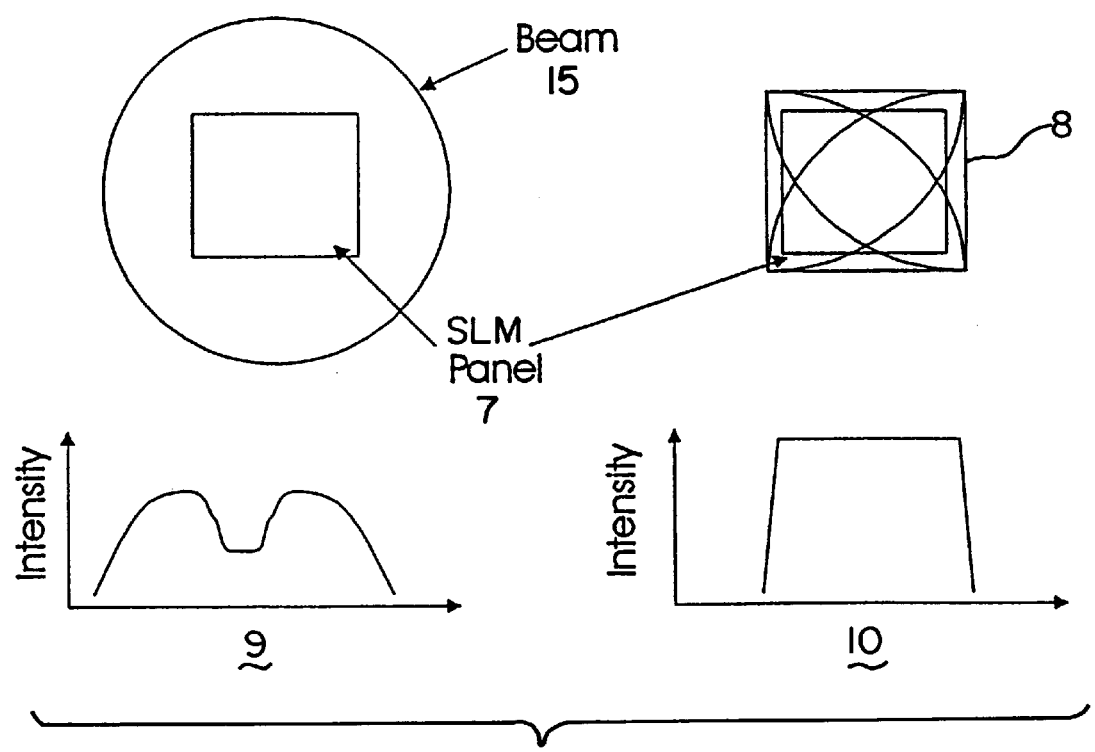
FIG. 7 illustrates intensity distributions in the embodiment of FIG. 6.

FIG. 7 illustrates at 9 a conventional intensity distribution, for instance as would be formed by the light source 1, 2 alone. As shown above the distribution 9, the SLM panel 7, for instance of a liquid crystal spatial light modulator, is illuminated by a beam 15 which is substantially larger than the panel 7. Thus, a substantial amount of light is lost and this represents inefficient use of light produced by a conventional light source. The four overlapped quadrant intensity profiles 8 are illustrated in FIG. 7 above the intensity distribution 10 produced at the SLM 7 of the display illustrated in FIG. 6. The intensity distribution 10 is very uniform and closely approaches the ideal distribution, which comprises a flat top with vertical edges. This arrangement allows a square or rectangular profile to be achieved which matches the size of the panel 7 so as to make efficient use of light from the light source 1, 2.

Figure 8:
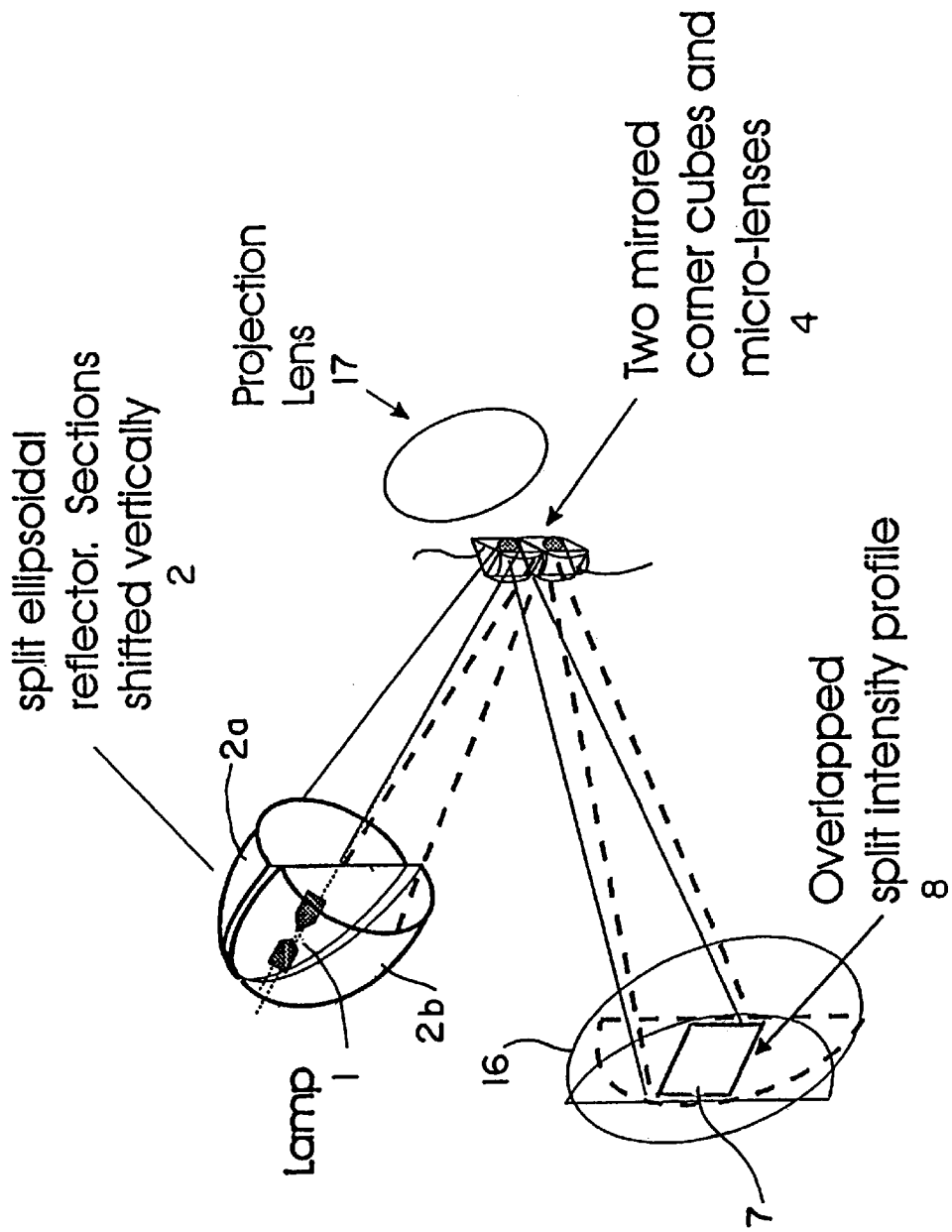
FIG. 8 is a view similar to FIG. 1 of a display constituting a fifth embodiment of the invention.

The display shown in FIG. 8 differs from that shown in FIG. 1 in that the split Fresnel lens 3 is omitted and the parabolic reflector 2 is replaced by a split ellipsoidal reflector 2. The reflector 2 is shown as being split into two sections 2a and 2b but may be split into any desired number of sections according to the number of optical sub-systems required. The sections 2a and 2b may be vertically displaced with respect to each other or may be angularly displaced about a horizontal axis through the focus at which the lamp 1 is located. The sections 2a and 2b constitute two optical sub-systems which form images of the light source 1, 2 with a spatial distribution different from that of the input apertures of the sub-systems, which are effectively the output apertures of the mirror sections 2a and 2b.

Each of the sections 2a, 2b performs the combined function of gathering light from the lamp 1 and imaging the light onto the reflecting surface of the corresponding mirrored corner cube 5. Otherwise, the display shown in FIG. 8 operates in the same way as that shown in FIG. 1.

Figure 9:
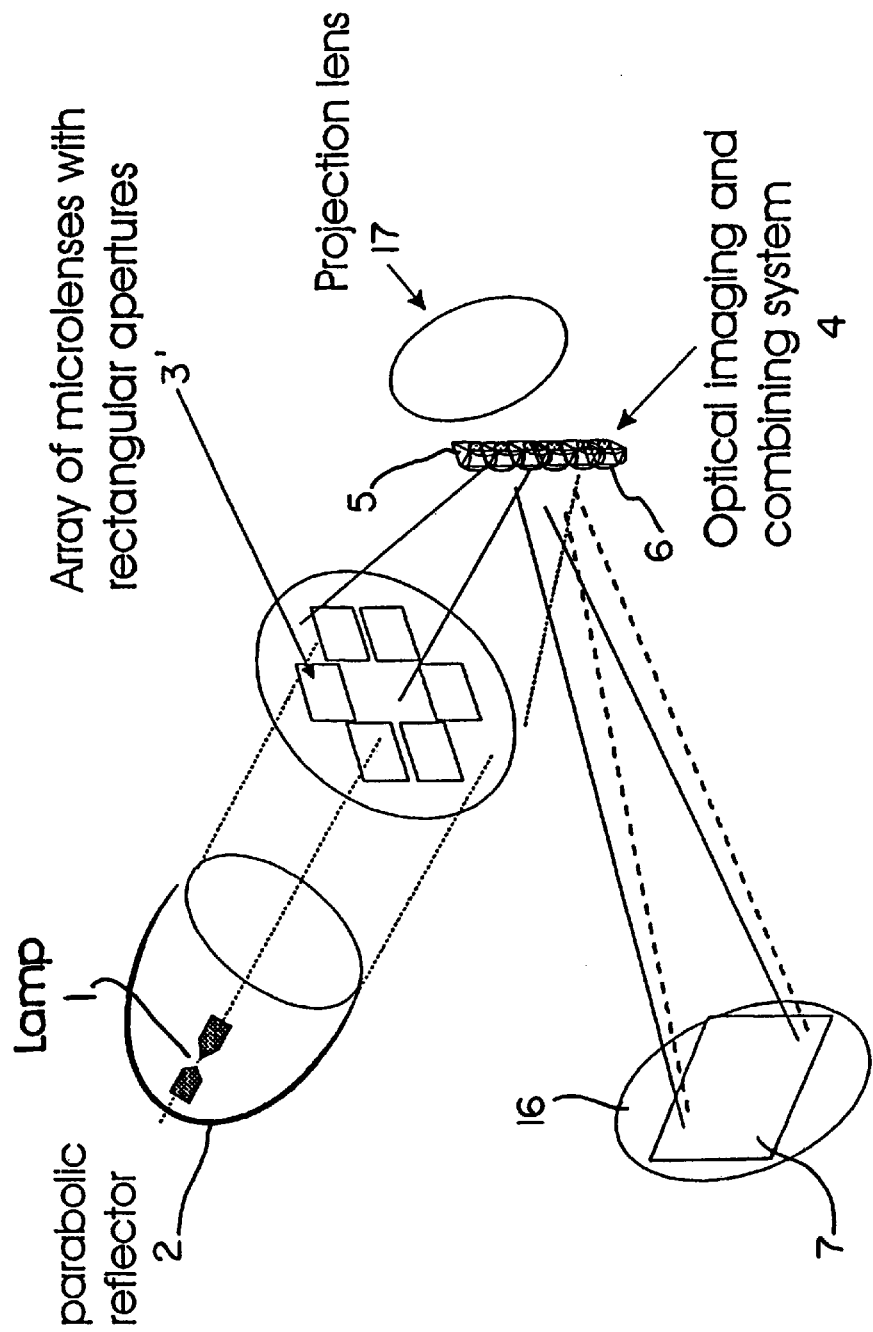
FIG. 9 is a view similar to FIG. 1 of a display constituting a sixth embodiment of the invention.

FIG. 9 illustrates a display which differs from that shown in FIG. 1 in that the split Fresnel lens 3 is replaced by an array 3' of microlenses with rectangular apertures. Each of the microlenses images the light source 1, 2 onto a respective mirrored corner cube 5 and microlense 6 of the system 4 which, in turn, images the rectangular aperture of the microlense of the array 3 via the field lens 16 on the SLM 7.

FIG. 10 illustrates the geometry involved in correctly aligning the reflecting surface 5b or mirror of the mirrored corner cube 5. In order for the mirror to be correctly oriented, the angles $\theta(x)$ and $\theta(z)$ of the normal n vector, having components $(x_n, y_n, z_n)$ must be determined. Components and angles are measured with respect to a three dimensional Cartesian co-ordinate system $(x, y, z)$.

The mirror normal is defined by:

$$n = (\tfrac{1}{2}) \ast \{a-c+(b-c)\ast|a-c|/|b-c|\}$$

The components $(x_n, y_n, z_n)$ can then be used to determine the angles as follows:

$$\theta(z) = a\tan(y_n/x_n)$$

and $$\theta(x) = a\tan(z_n/(x_n^2 + y_n^2)^{1/2})$$

where the vectors a, b, c, d are defined as follows:

a=(a1,a2,a3) represents the vector at the centre of the lens rectangular section;

b=(b1,0,0) represents the vector at the centre of the device;

c=(d1,d2-F,d3) represents the vector at the centre of the mirror; and d=(d1,d2,d3) represents the vector at the optical centre of the lens section.

The focal length $f_m$ of the microlense attached to the mirrored corner cube may then be calculated from the following expression:

$$1/f_m = (1/F) + (1/L)$$

where F is the focal length of the microlenses of the array 3 and L is the distance between the mirror plane and the device plane.

For example, with the following values in millimeters:

a=(7.5, 70, 13.25)

b=(0, 60, 0)

c=(0, 0, 7.5)

F=70

L=60 the following values are calculated:

$$\theta(z) = 38.7°$$

$$\theta(x) = -2.6°$$

$$f_m = 32.3 \text{ mm}$$

The displays described hereinbefore have the mirrored corner cubes 5 and microlenses 6 or parabolic mirrors 11 arranged as one dimensional arrays. However, other arrangements are possible and FIG. 11 illustrates a display which differs from that shown in FIG. 9 in that the mirrored corner cubes 5 and microlenses 6 are arranged as a two dimensional array forming the optical imaging and combining system 4.

Figure 11:
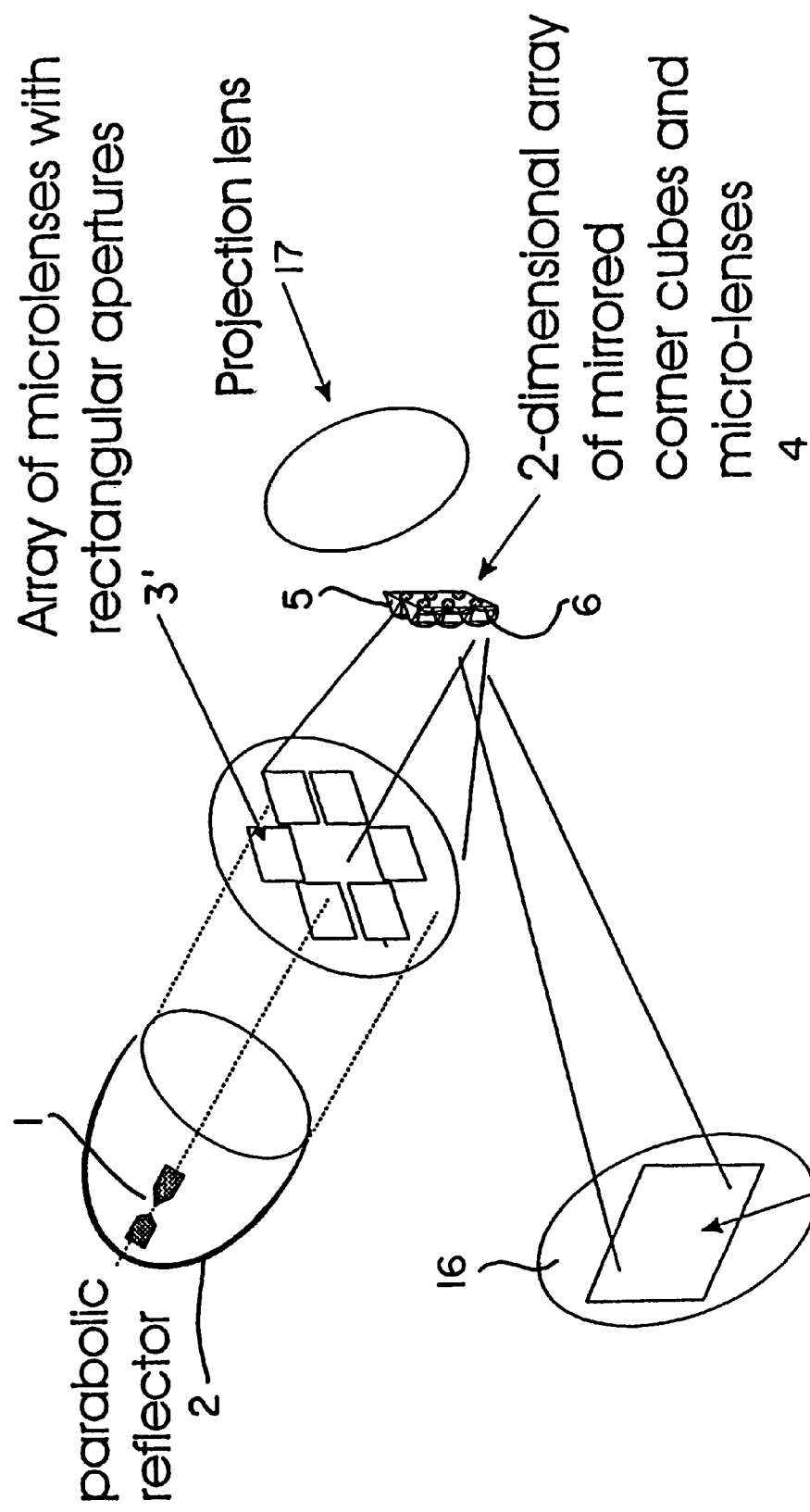
FIG. 11 is a view similar to FIG. 1 of a display constituting a seventh embodiment of the invention.
Figure 12:
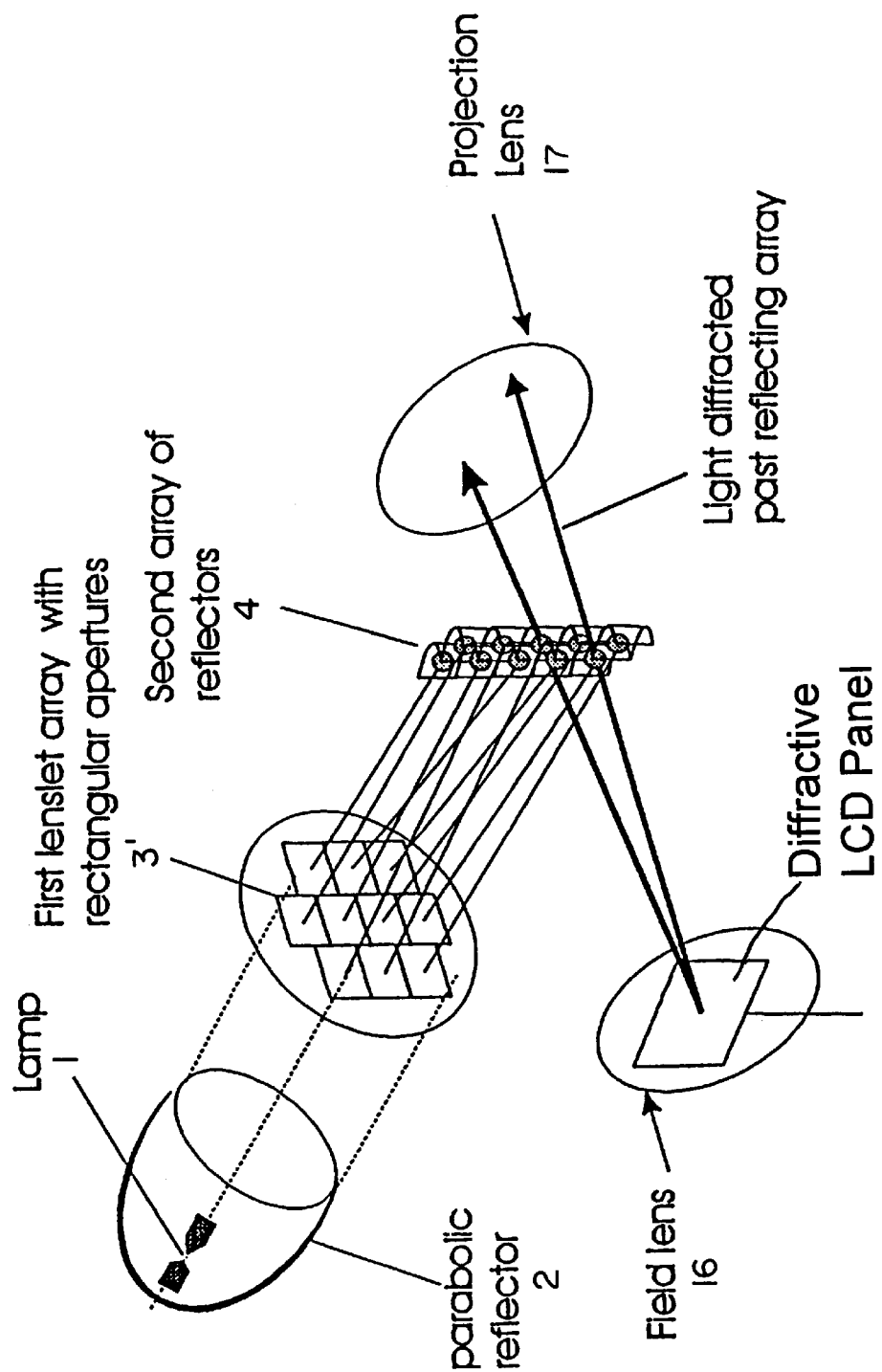
FIG. 12 is a view similar to FIG. 1 of a display constituting an eighth embodiment of the invention.

FIG. 12 illustrates a display using an array 3' of microlenses with rectangular apertures as shown in FIG. 11. However, the display of FIG. 12 differs from that of FIG. 11 in that the number of microlenses is increased and the system comprises a two dimensional array of off-axis parabolic mirrors.

It is thus possible to provide a dark field display having substantially improved uniformity of image illumination. The illumination can be accurately matched to a SLM panel size. For instance, the illumination may be made more one dimensional by reducing the extent in the appropriate direction so as to improve the performance of displays which require one dimensional illumination. For SLMs having two dimensional apertures requiring even illumination, the illumination can be more accurately matched to the shape and size of the SLM so as to reduce the amount of light wasted around the periphery of the SLM Thus, in addition to improving the uniformity of illumination, an increase in the brightness of the display may be achieved.

What is claimed is:

1. A dark field projection display comprising:

a light source;

a spatial light modulator; and an optical system for directing light from the light source onto the spatial light modulator, wherein the optical system includes;

a plurality of optical subsystems, each of which has an input aperture and is arranged to image light from the light source, the subsystems forming a spatial distribution of source images whose relative positions are different from the relative positions of the input apertures; and a plurality of reflectors disposed at the relative positions of the source images, each of the reflectors being arranged to reflect light from a respective one of the subsystems onto the spatial light modulator.

2. A display as claimed in claim 1, wherein the reflectors are disposed between the spatial light modulator and a projection optic for receiving light deflected by the spatial light modulator.

3. A display as claimed in claim 1, wherein a field lens is disposed between reflectors and the spatial light modulator.

4. A display as claimed in claim 1, wherein each of the reflectors is associated with imaging means for forming overlapping images of the input apertures at the spatial light modulator.

5. A display as claimed in claim 4, wherein the overlapping images are substantially superimposed on each other.

6. A display as claimed in claim 4, wherein each reflector comprises a plane reflector and is associated with an image forming device.

7. A display as claimed in claim 6, wherein each image forming device is a converging lens.

8. A display as claimed in claim 4, wherein each reflector comprises a concave reflector.

9. A display as claimed in claim 8, wherein each reflector comprises a mirror whose reflecting surface has the shape of part of a paraboloid.

10. A display as claimed in claim 1, wherein the input apertures are arranged as a two dimensional array and the spatial distribution of source images comprises a one dimensional array.

11. A display as claimed in claim 1, wherein each subsystem comprises an optical imaging element.

12. A display as claimed in claim 11, wherein each of the imaging elements comprises a converging lens.

13. A display as claimed in claim 12, wherein the converging lenses comprise relatively displaced portions of a Fresnel lens.

14. A display as claimed in claim 12, wherein the converging lenses comprise an array of microlenses.

15. A display as claimed in claim 14, wherein the microlenses have rectangular apertures.

16. A display as claimed in claim 11, wherein the light source comprises a light emitter and a concave reflector and the optical imaging elements comprise relatively displaced portions of the concave reflector.

17. A display as claimed in claim 16, wherein the reflector is of ellipsoidal shape.

* * * * *